(12) United States Patent
Boniface (10) Patent No.: US 10,823,082 B2
(45) Date of Patent: Nov. 3, 2020

(54) GAS TURBINE ENGINE WITH A GEARED TURBOFAN ARRANGEMENT

(71) Applicant: Rolls-Royce Deutschland Ltd & Co KG, Blankenfelde-Mahlow (DE)

(72) Inventor: Dominic Boniface, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 226 days.

(21) Appl. No.: 15/961,014

(22) Filed: Apr. 24, 2018

(65) Prior Publication Data

US 2018/0313275 A1 Nov. 1, 2018

(30) Foreign Application Priority Data

Apr. 28, 2017 (EP) .................................... 17168689
Aug. 30, 2017 (EP) .................................... 17188584

(51) Int. Cl.
| | | |
|---|---|---|
| *F16D 41/12* | (2006.01) | |
| *F02C 7/36* | (2006.01) | |
| *F01D 21/00* | (2006.01) | |
| *F02K 3/06* | (2006.01) | |

(52) U.S. Cl.
CPC ............... *F02C 7/36* (2013.01); *F01D 21/00* (2013.01); *F02K 3/06* (2013.01); *F16D 41/12* (2013.01); *F05D 2260/40311* (2013.01); *F05D 2270/116* (2013.01)

(58) Field of Classification Search
CPC ........... F16D 41/02–24; F02C 7/32–36; F05D 2260/40–40311; F05D 2270/116; F16H 1/32; F16H 2001/328
See application file for complete search history.

(56) References Cited

U.S. PATENT DOCUMENTS

| 2014/0212299 A1* | 7/2014 | Edwards ................. B64C 11/48 |
| | | 417/53 |
| 2015/0292415 A1* | 10/2015 | Anglin .................... F16F 1/042 |
| | | 415/119 |
| 2015/0292577 A1 | 10/2015 | Anglin et al. |

FOREIGN PATENT DOCUMENTS

| EP | 2930333 A1 | 10/2015 | |
| GB | 790550 A * | 2/1958 | ............... F02C 7/36 |
| GB | 1533884 A | 11/1978 | |

OTHER PUBLICATIONS

European Search Report dated Mar. 14, 2018 from counterpart EP App No. EP 17 188 584.1.

\* cited by examiner

*Primary Examiner* — Ernesto A Suarez
*Assistant Examiner* — Lillian T Nguyen
(74) *Attorney, Agent, or Firm* — Shuttleworth & Ingersoll, PLC; Timothy Klima (57) ABSTRACT

A gas turbine engine with a geared turbofan arrangement with a gearbox in a drive train driven by a turbine, a driving side of the gearbox being driveably connected with a propulsive fan, with at least one torque transmission device positioned in the drive train, the torque transmission device having an asymmetric torque transmission characteristic, so that torque is transmittable by the torque transmission device under a nominal rotational direction and no torque is transmittable by the torque transmission device in a non-nominal rotational direction.

7 Claims, 8 Drawing Sheets

GAS TURBINE ENGINE WITH A GEARED TURBOFAN ARRANGEMENT

This application claims priority to European Patent Application 17168689.2 filed Apr. 28, 2017 and European Patent Application 17188584.1 filed Aug. 30, 2017. The entirety of both application are incorporated by reference herein.

DESCRIPTION

Disclosed is a gas turbine engine with a geared turbofan arrangement with the features disclosed herein.

Gas turbine engines with geared turbofan arrangements, in particular aircraft engines, require some means to mitigate damages that might occur after a failure. A failure might involve the rotation prevention of at least one part of the drive train. Such a failure might be e.g. a shaft breaking, a rotor-casing contact or a bearing seizure. This becomes even more important for high bypass aircraft engines, in which the drag of a locked fan would be considerable. Under an extreme event an excessive torque is experience in the non-nominal rotation direction.

Therefore, gas turbine engines, in particular aircraft engines with an improved resilience are required.

This is addressed by a gas turbine engine with the features disclosed herein.

The gas turbine engine comprises at least one torque transmission device positioned in the drive train of the gas turbine engine. That means the torque transmission within the drive train involving shafts, a gearbox and possibly other units place at least through one torque transmission device with an asymmetric torque transmission characteristic, so that torque is transmittable by the torque transmission device under a nominal rotational direction and no torque is transmittable by the torque transmission device in a non-nominal rotational direction.

In one embodiment the at least one torque transmission device comprises a torque input device and a torque output device with a plurality of torque transmission elements extending from the torque input device to the torque output device or from the torque output device to the torque input device establishing under the nominal rotational direction a friction connection and/or a form locking connection between the torque input device and the torque output device. There can be a relative movement between the torque input device and the torque output device. The torque transmission elements allow of a torque transmission only in one rotational direction, i.e. the nominal direction.

In one particular embodiment the transmission elements are configured as pawl-elements formlocking with matching ratchet-elements under nominal conditions to transmit torque. In another embodiment the transmission elements are configured as eccentric cam elements are configured to block the rotation in the non-nominal direction. Both embodiments allow the rotation and torque transmission only in one direction, and no rotation and no torque transmission in the opposite direction.

In a further embodiment, the transmission elements, in particular the pawl-elements or the cam elements are connected, in particular pivotably connected at torque output device or torque input device.

Furthermore, it is possible that the torque transmission elements are configured as elastic elements under tension, so that under the nominal rotation direction the elastic force acts from the torque transmission elements onto the torque input device or the torque output device to allow the torque transmission. The elastic force is the result of the energy stored in the elastic elements through the applied tension within the elastic elements.

Such elastic elements can comprise bent metal blades or sections cut and/or formed at the circumference of a rotational part of the drive train. Since the shape and/or the size of the elastic elements can be designed, it is possible to configure them with a defined buckling condition, in particular to define a failure mode for the torque transmission in the non-nominal rotation direction.

In a further embodiment, 5 to 40, in particular 25 to 35 elastic torque transmission elements are positioned, in particular with identical angular distances between the torque transmission elements, around the circumference of a part in the drive train.

In a further embodiment the input torque is transmitted from a ring gear of the gearbox and the output torque is transmitted to a structure in the engine.

In another embodiment the at least one torque transmission device is positioned on the output side of the gearbox.

Embodiments can be in particular configured as a geared turbofan engine of an aircraft.

Embodiments of the invention are shown in the figures, where.

Figure 1:
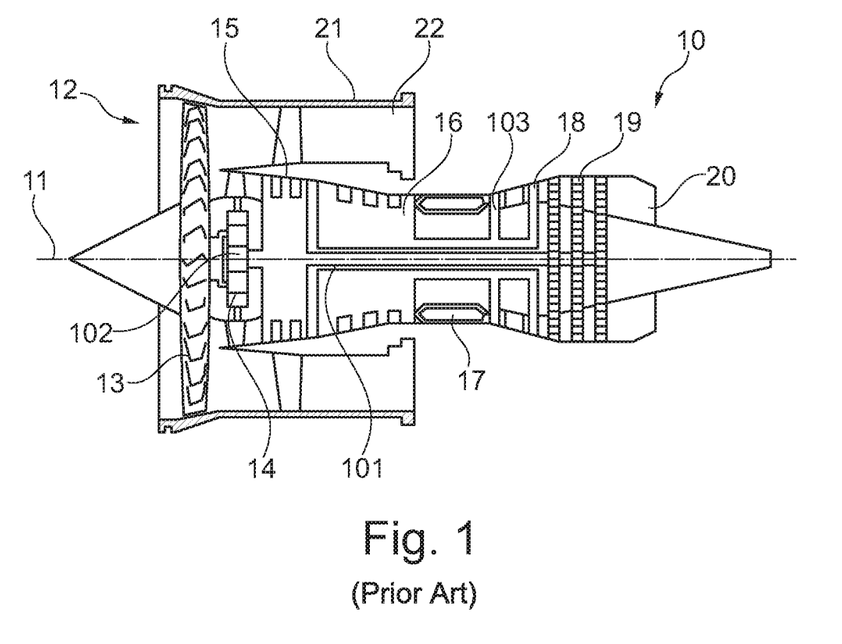
FIG. 1 shows a schematic drawing of a gas turbine engine according to the prior art.

With reference to FIG. 1, a gas turbine engine is generally indicated at 10, having a principal and rotational axis 11. The engine 10 comprises, in axial flow series, an air intake 12, a propulsive fan 13 (could be more than one stage), a gearbox 14, an intermediate pressure compressor 15, a high-pressure compressor 16, a combustion equipment 17, a high-pressure turbine 18, an intermediate-pressure turbine 19 and an exhaust nozzle 20. A fan casing 21 generally surrounds the engine 10 and defines the intake 12.

The gas turbine engine 10 works in the conventional manner so that air entering the intake 12 is accelerated by the propulsive fan 13 to produce two air flows: a first air flow into the intermediate pressure compressor 15 and a second air flow which passes through a bypass duct 22 to provide the main propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture is combusted. The resultant hot combustion products then expand through, and thereby drive the high pressure turbine 18 and intermediate pressure turbine 19 before being exhausted through the nozzle 20 to provide additional propulsive thrust. The high pressure turbine 18 and the intermediate pressure turbine 19, respectively, drive the high pressure compressor 16 and the intermediate pressure compressor 15, each by suitable interconnecting shaft assembly.

An intermediate pressure shaft 101 also drives the propulsive fan 13 via the gearbox 14. The gearbox 14 is a reduction gearbox in that it gears down the rate of rotation of the propulsive fan 13 by comparison with the intermediate pressure compressor 15 and intermediate pressure turbine 19.

The gearbox 14 is an epicyclic planetary gearbox having a static ring gear, rotating and orbiting planet gears supported by a planet carrier and a rotating sun gear 102. In the embodiment shown the output of the gearbox 14 is through the carrier. In principle other gearbox 14 designs can be used.

The embodiment shown in FIG. 1 has a specific shaft arrangement which is understood not to be limiting. The embodiments disclosed in the following can also work with a 2- or 3-shaft arrangement.

As shown in FIG. 1, geared turbofan engines 10 are known in the art. With increasing power ratings and/or increasing diameters of the propulsive fans 13, the loads on the gas turbine engines 10 are increasing. Therefore, it seems advisable to introduce measures to counteract potential failure modes or extreme events such as e.g. a fan blade off, a core blade off, a bird strike, a mainline bearing seizure or a gearbox 14 seizure.

Figure 2:
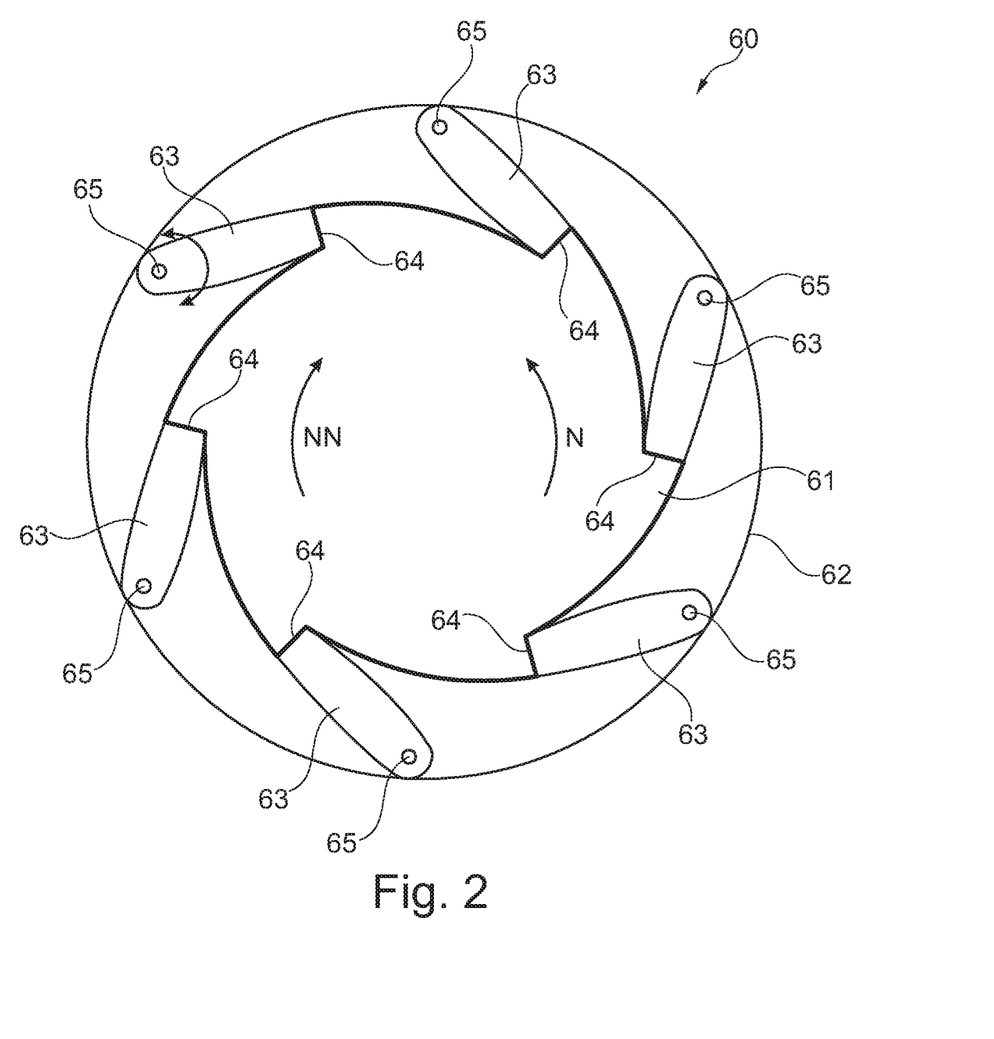
FIG. 2 shows a frontal view of an embodiment of a torque transmission device.

In FIG. 2 a frontal view of an embodiment of a torque transmission device 60 is shown. This transmission device 60 is built into the drive train of the gas turbine engine to limit the torque, i.e. the transmission device 60 is a device for deliberately disconnecting two parts of the relevant drive train (see FIG. 3).

Here the drive train (see FIG. 3) comprises the shafts 101, 103 leading from the turbines 18, 19 to the compressors 15, 16, the gearbox 14 and the propulsive fan 13. The drive train from gearbox 14 towards the front of the gas turbine engine 10 comprise, a fan shaft 105 and a disk 106.

The torque transmission device 60 comprises a torque input device 61, in the embodiment shown in FIG. 2 the inner shaft with a nominal counter clockwise rotation direction N. Input torque from the input torque device 61 is transmitted through a plurality of torque transmission elements 63 to an output torque device 62.

In the embodiment shown in FIG. 2 six torque transmission elements 63 configured as configured as pawl-elements are formlocking with matching ratchet elements 64 under nominal conditions, i.e. under nominal rotation direction N, to transmit the torque. In effect the torque transmission device 60 comprises a ratchet device which allows torque transmission only in one direction.

The torque transmission elements 63—which are here essentially bar or pin shaped—are pivotably mounted on the torque output device 62 (see double arrow at one of the pivot mounts 65) at an angle formlocking with the ratchet elements 64. The torque transmission elements 63 are positioned symmetrically with equal angular distances (here 60°) around the torque output device 62. The ratchet elements 64 are teeth-like structures with one steep front side and a sloped (or curved) backside at the circumference.

The torque transmission elements 63 can be coupled with elastic element to restore the position of the torque transmission elements 63 if it has been moved out of its base position. This can be e.g. a torsion spring which is positioned around the pivot mounts 65 shown in FIG. 2.

Figure 2A:
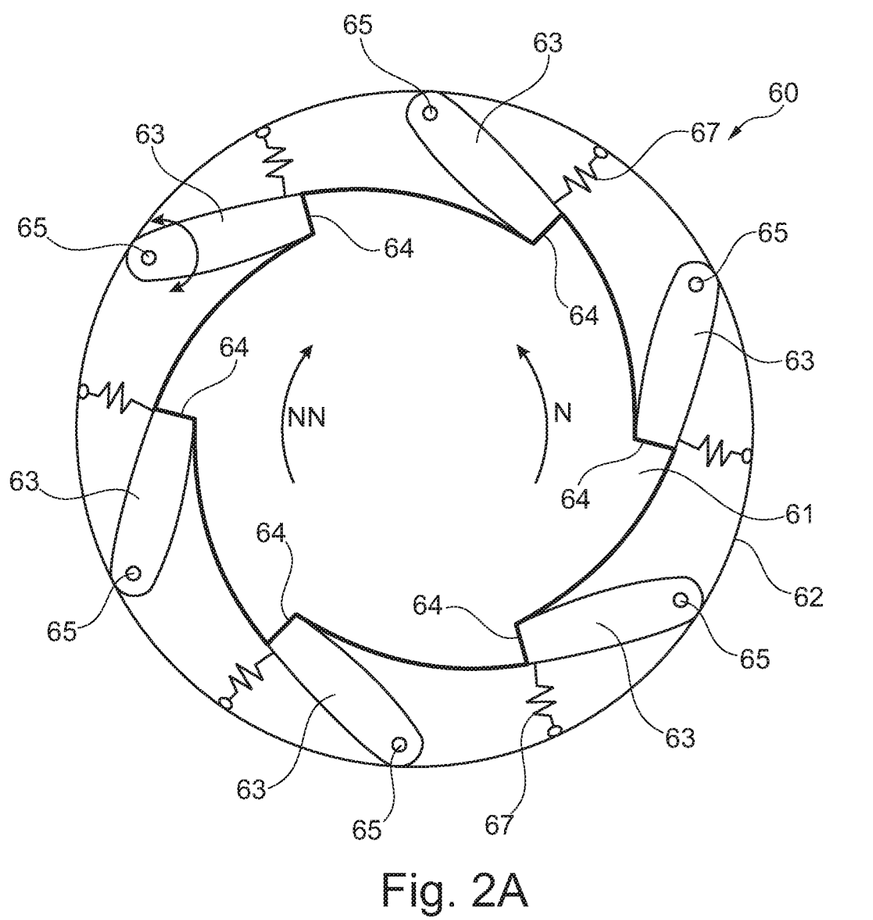
FIG. 2A shows an alternative to the embodiment shown in FIG. 2.
Figure 2B:
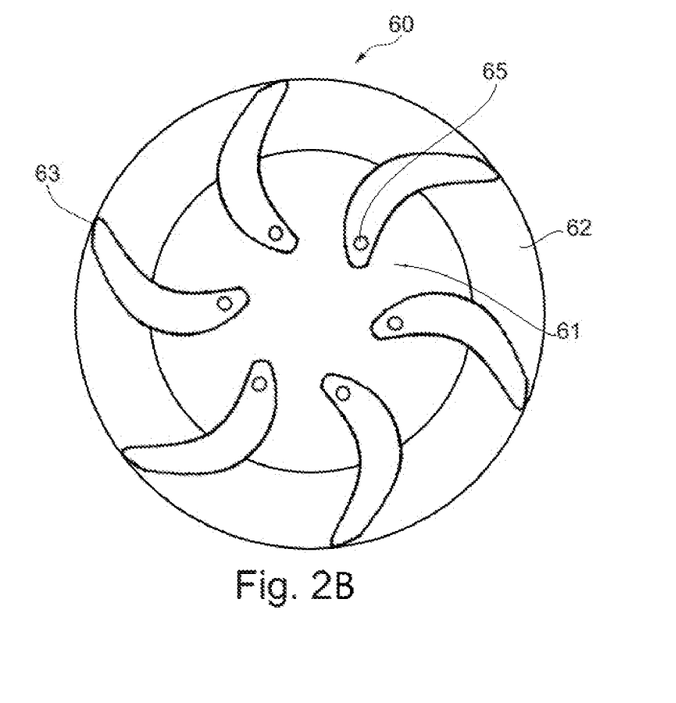
FIG. 2B shows a frontal view of a further embodiment of the torque transmission device with eccentric cams.
Figure 2C:
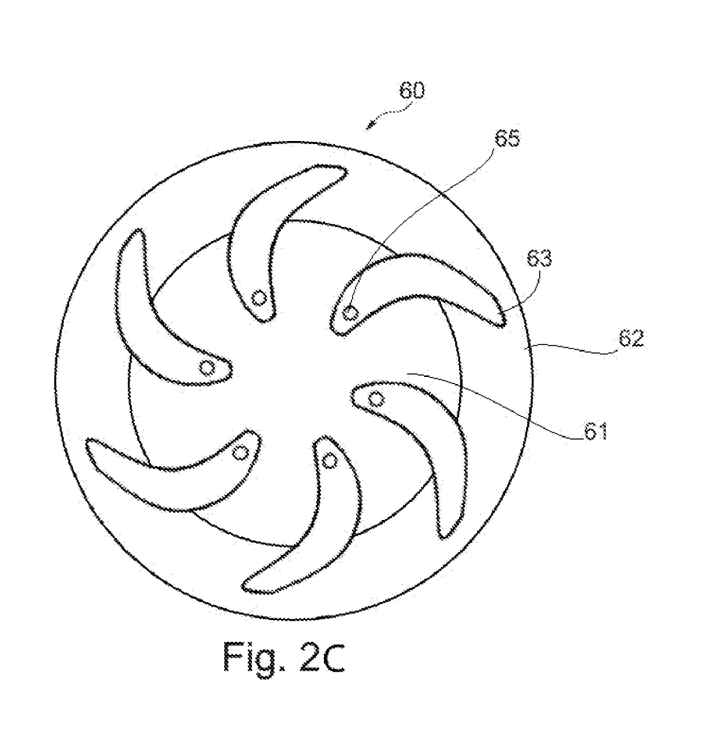
FIG. 2C shows another frontal view of the embodiment shown in FIG. 2B.

In FIG. 2A an alternative embodiment is shown. Here springs 67 are positioned on the torque transmission elements 63 as the distal end from the pivot mounts 65. In FIGS. 2B and 2C an alternative embodiment is shown in which the torque transmission elements 63 are configured as eccentric cam elements which block the rotation in the non-nominal direction NN. Here eccentric cam elements are pivotably connected via pivot mounts 65.

In case the torque input device 61 changes the direction of rotation, i.e. into non-nominal rotation direction NN (here clockwise direction), the torque transmission elements 63 disengage from the ratchet elements 64 and no torque is transmitted.

In an alternative embodiment the torque transmission elements 63 are pivotably mounted on the inner ring form-locking to ratchet element 64 on the outside ring. Also the number of torque transmission element 63 can differ in other embodiments.

Figure 3:
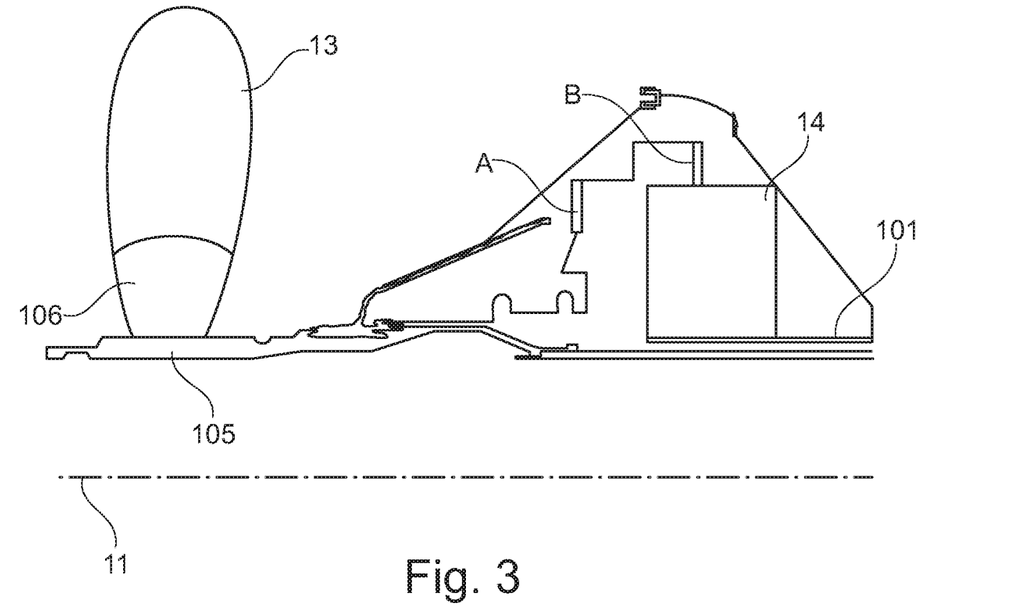
FIG. 3 shows a schematic sectional view of the drive train with possible locations for the torque transmission device at the front of the gas turbine engine.

In FIG. 3 a cross-sectional view of the frontal part of the gas turbine engine 10 is shown. This shows the drive train the propulsive fan 13 from the intermediate shaft 101 via the gearbox 14, the fan shaft 105 and the fan disk 106. The torque transmission device 60 can e.g. be positioned in the drive train (e.g. the ring gear mount of the gearbox 14) at the output side of the gearbox 14. In FIG. 3 two possible locations A and B for the torque transmission device 60 are indicated.

Figure 4:
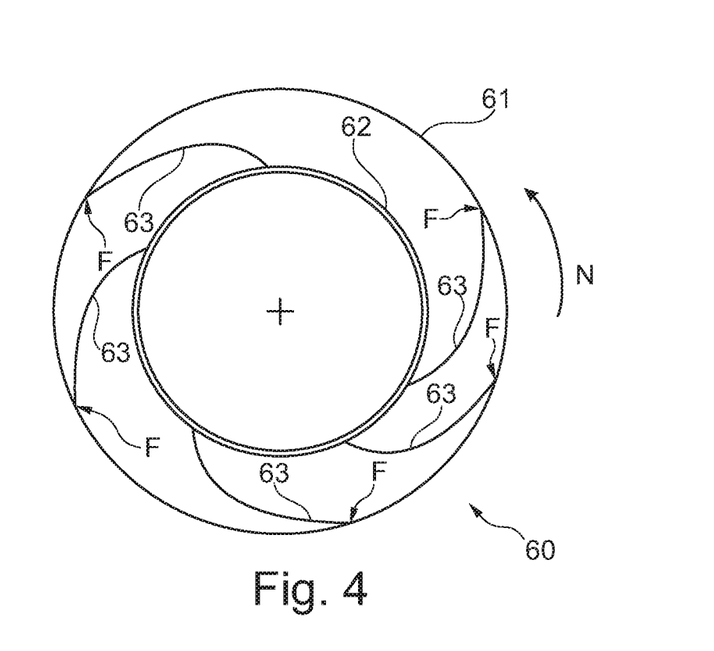
FIG. 4 shows a frontal view of a further embodiment of the torque transmission device.

In FIG. 4 a further embodiment of the torque transmission device is shown. Here the torque transmission elements 63 are configured as elastic elements under tension, so that under nominal rotation direction N here clockwise) the elastic force F acts from the torque transmission elements 63 onto the torque input device 61 to allow the torque transmission.

In the embodiment shown in FIG. 4 the torque input device 61 connected to a shaft (see FIG. 3) is on the outside of the torque output device 62 connected to the propulsive fan 13 of the gas turbine engine 10. For the sake of simplicity, only five torque transmission elements 63 are shown here. Depending on the size of the design and the magnitude of the torque to transmit, the number of elastic torque transmission elements 63 can be between 5 and 50, in particular between 20 and 40.

The elastic torque transmission elements 63 can be e.g. made from metal, in particular elastic steel strips mounted in the embodiment shown on the torque output device 62. In connection with FIG. 7 a method of how to manufacture such structure with torque transmission elements 63 will be disclosed.

The torque transmission is effected here through a friction connection in the nominal rotation direction N (here counter-clockwise). In case the rotational direction changes in to the non-nominal direction (here clockwise), the strip-like (or blade-like) torque transmission elements 63 buckle and break. This disconnects the torque input device 61 and the torque output 62, preventing the transmission of any torque load.

Figure 5:
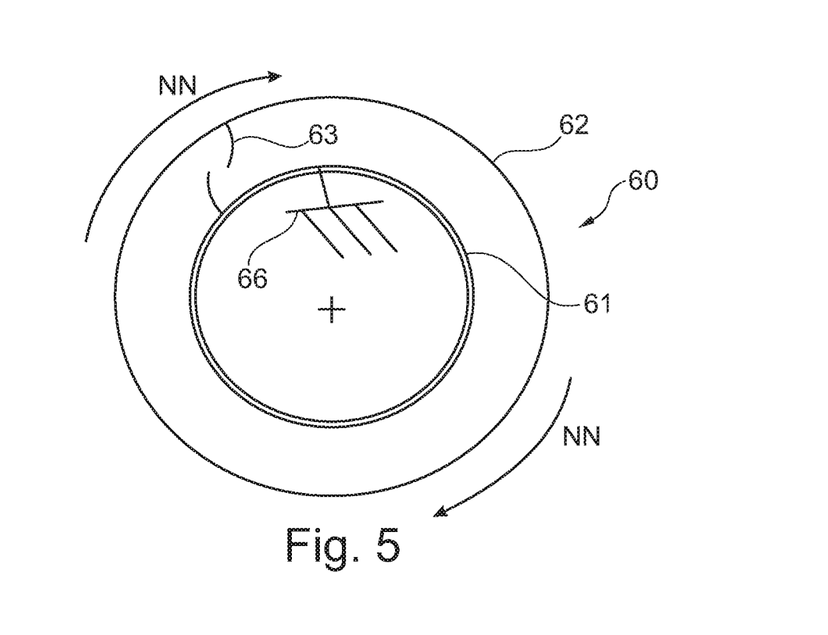
FIG. 5 shows the buckling and breaking of a torque transmission element under non-nominal rotation.

This is shown in FIG. 5, where the torque input device 61 is on the inside, fixed to some structure 66 in the gas turbine engine 10. The torque output device 62 is on the outside. Otherwise this embodiment is similar to the one shown in FIG. 4 so that the respective description applies. The shown non-nominal clockwise rotation direction NN leads to the buckling and the breakage of the torque transmission element 63 (only one shown here).

Figure 6:
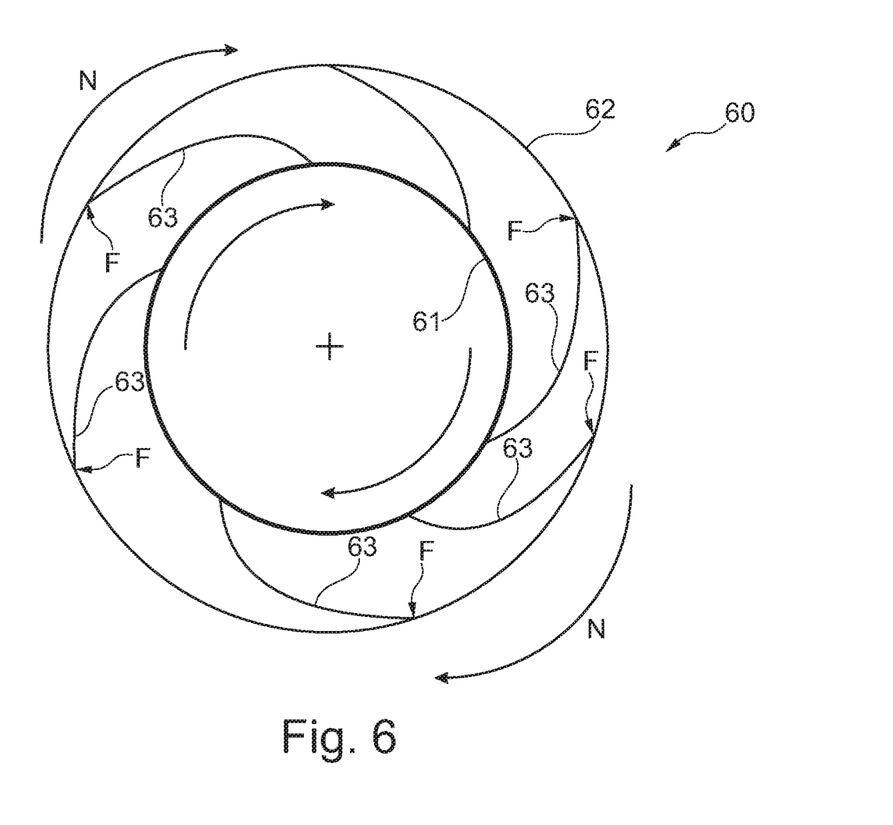
FIG. 6 shows a frontal view of a variation of the embodiment shown in FIG. 4.

In FIG. 6 a variation of the embodiment of FIG. 4 is shown so that the respective description applies. Here the torque input device 61 is on the inside, the torque output device 62 is on the outside. The nominal rotation direction N is counter clockwise.

Figure 7:
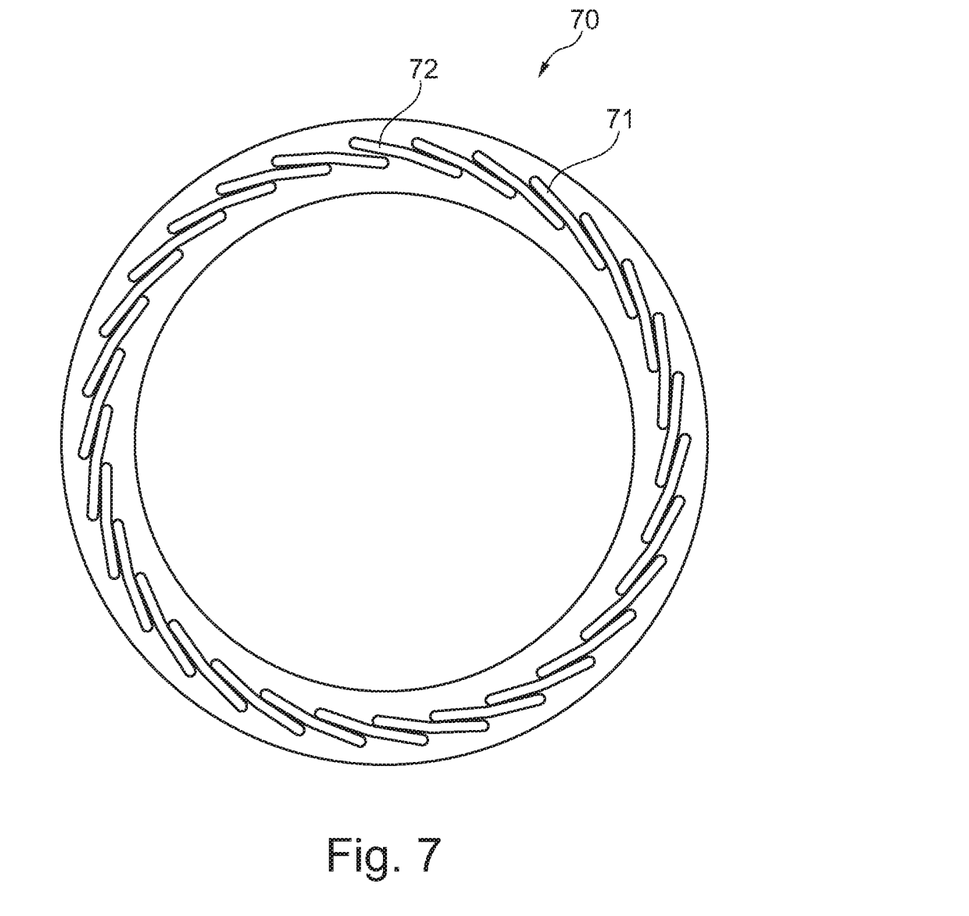
FIG. 7 show a ring structure forming the basis for manufacturing an embodiment as shown in FIG. 4, 5, or 6.

In FIG. 7 a frontal view of a steel blank piece 70 is shown, which can form the basis for one of the embodiments of the torque transmission device 60 in FIGS. 4, 5, and 6.

Around the circumference of the blank piece 70 angled cuts 71 are milled in to the steel. Between the cuts 71 some thin steel strips 72 remains with e.g. a thickness of 4 mm.

If the rim of the blank piece 70 is removed, e.g. milled away down to the thin steel strip 72, the strip 72 is freed of the surrounding material and protrudes tangentially and elastically away from the blank piece 70. This is a structure which then can be used in the above mentioned embodiments. The strips 72 of the blank piece 70 become the elastic strip-like torque transmission elements 63 at the torque output device 62 shown e.g. in FIG. 4, 5 or 6. If this piece is assembled with surrounding ring-like structure for the complementary torque input device 61 with the torque transmission elements under tension, the basic torque transmission device 60 has been put together.

LIST OF REFERENCE NUMBERS 10 gas turbine engine
11 principal rotational axis
12 air intake
13 propulsive fan
14 gearbox, power gearbox
15 intermediate pressure compressor
16 high-pressure compressor
17 combustion equipment
18 high-pressure turbine
19 intermediate-pressure turbine
20 exhaust nozzle
21 fan casing
22 by-pass duct
60 torque transmission device
61 torque input device
62 torque output device
63 torque transmission elements
64 ratchet element
65 pivot
66 structure of gas turbine engine
67 elastic element, restoring spring
70 blank piece
71 cut
72 steel strip
101 intermediate pressure shaft
102 sun gear of power gearbox
103 high pressure shaft
105 fan shaft
106 fan disk
A, B possible locations of the torque transmission device
F elastic Force
N nominal rotation
NN non-nominal rotation

The invention claimed is:

1. A gas turbine engine comprising:
a turbine including a drive train driven by the turbine;
a propulsive fan;
a geared turbofan arrangement including a gearbox, wherein the gearbox is located in the drive train, and wherein the gearbox includes a driving side which is driveably connected with the propulsive fan;
a torque transmission device positioned in the drive train, wherein the torque transmission device transmits torque asymmetrically, so that torque is transmitted by the torque transmission device under a nominal rotational direction and no torque is transmitted by the torque transmission device in a non-nominal rotational direction, and wherein the torque transmission device includes:
a torque input device;
a torque output device:
a plurality of torque transmission elements which are one chosen from extending from the torque input device to the torque output device and extending from the torque output device to the torque input device;
wherein the plurality of torque transmission elements under the nominal rotational direction establish at least one chosen from a friction connection and a form-locking connection between the torque input device and the torque output device; and
wherein the plurality of torque transmission elements includes a plurality of eccentric cam elements which block rotation in the non-nominal rotational direction.

2. The gas turbine engine according to claim 1, wherein the plurality of torque transmission elements are connected at one chosen from the torque output device and the torque input device.

3. The gas turbine engine according to claim 2, wherein the plurality of torque transmission elements are pivotably connected at one chosen from the torque output device and the torque input device.

4. The gas turbine engine according to claim 1, wherein the gearbox includes a ring gear and the gas turbine engine includes a structure, wherein an input torque is transmitted from the ring gear, and wherein an output torque is transmitted to the structure.

5. The gas turbine engine according to claim 1, wherein the gearbox includes an output side and wherein torque transmission device is positioned on the output side.

6. The gas turbine engine according to claim 1, wherein the gas turbine engine is a geared turbofan engine of an aircraft.

7. The gas turbine engine according to claim 1, wherein the gearbox is a planetary gearbox.

* * * * *